(12) United States Patent
Siomina et al.

(10) Patent No.: US 9,696,406 B2
(45) Date of Patent: Jul. 4, 2017

(54) APPARATUS AND METHOD FOR ENHANCED UL POSITIONING SUPPORT VIA WIRELESS DEVICE

(71) Applicant: Telefonaktiebolaget L M Ericsson (publ), Stockholm (SE)

(72) Inventors: Iana Siomina, Solna (SE); Yang Zhang, Shanghai (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 768 days.

(21) Appl. No.: 14/002,586

(22) PCT Filed: Jul. 17, 2013

(86) PCT No.: PCT/SE2013/050914
§ 371 (c)(1),
(2) Date: Aug. 30, 2013

(87) PCT Pub. No.: WO2014/021766
PCT Pub. Date: Feb. 6, 2014

(65) Prior Publication Data
US 2014/0080509 A1    Mar. 20, 2014

Related U.S. Application Data

(60) Provisional application No. 61/678,402, filed on Aug. 1, 2012.

(51) Int. Cl.
*H04W 24/00* (2009.01)
*G01S 5/10* (2006.01)
(Continued)

(52) U.S. Cl.
CPC .............. *G01S 5/10* (2013.01); *H04W 64/00* (2013.01); *H04W 72/0413* (2013.01)

(58) Field of Classification Search
USPC ............................................... 455/456.1–457
See application file for complete search history.

(56) References Cited

U.S. PATENT DOCUMENTS 8,787,942 B2 * 7/2014 Hannan ................. G01S 5/0036
370/328
8,897,813 B2 * 11/2014 Hannan ................. G01S 5/0205
370/338

(Continued)

FOREIGN PATENT DOCUMENTS

WO    2012044246 A1    4/2012
WO    2012112104 A1    8/2012

OTHER PUBLICATIONS

Author Unknown, "On RRM framework for NBPS," 3GPP TSG-RAN WG4 Meeting #64bis; R4-125783; Ericsson; Oct. 8-12, 2012; pp. 1-2; Santa Rosa, California, US.

(Continued)

*Primary Examiner* — Charles Appiah
*Assistant Examiner* — Randy Peaches
(74) *Attorney, Agent, or Firm* — Murphy, Bilak & Homiller, PLLC

(57) ABSTRACT

In one aspect, methods and apparatuses disclosed herein improve positioning based on UL signals in a wireless communication network, by sending UL transmission configuration from wireless devices, and by using that information in the network for performing UL-based positioning of the devices. In this regard, the teachings herein advantageously recognize that obtaining UL transmission configuration information from the wireless devices themselves represents a more efficient, complete and richer mechanism for obtaining parameters relevant to configuring and performing UL-based positioning operations. As a further example advantage, the teachings herein provide for control-plane and/or user-plane signaling of UL transmission con- (Continued)

figuration information, which comprises, for a given wireless device, at least one of resource allocation information for one or more UL transmissions for the wireless device, and UL signal characteristics information.

16 Claims, 6 Drawing Sheets

(51) Int. Cl.
*H04W 64/00* (2009.01)
*H04W 72/04* (2009.01)

(56) References Cited

U.S. PATENT DOCUMENTS

| | | |
|---|---|---|
| 2007/0155401 A1 | 7/2007 | Ward et al. |
| 2011/0260863 A1 | 10/2011 | Hooli et al. |
| 2012/0020320 A1 | 1/2012 | Issakov et al. |
| 2012/0040687 A1 | 2/2012 | Siomina et al. |
| 2013/0051288 A1* | 2/2013 | Yamada ............... H04W 8/24 370/280 |

OTHER PUBLICATIONS

Author Unknown, "On RRM aspects with NBPS," 3GPP TSG-RAN WG4 Meeting #66bis; R4-131610; Ericsson; Apr. 15-19, 2013; pp. 1; Chicago, Illinois, US.

Author Unknown, "New SI: Positioning enhancements for E-UTRA," 3GPP TSG-RAN meeting #59; RP-130303; Huawei, HiSilicon; Feb. 26-Mar. 1, 2013; pp. 1-5; Vienna, Austria.

\* cited by examiner

APPARATUS AND METHOD FOR ENHANCED UL POSITIONING SUPPORT VIA WIRELESS DEVICE

TECHNICAL FIELD

The present invention relates to wireless communication networks and in particular to performing positioning in such networks based on uplink, UL, measurements, such as Uplink Time Difference of Arrival, UTDOA.

BACKGROUND

The possibility of determining the positions of mobile devices has enabled application developers and wireless network operators to provide location based, and location aware, services. Examples services include guidance/navigation services, shopping assistance, friend finder, presence services, community and communication services, and other information services that give mobile users information about their surroundings.

In addition to commercial services, various governments have imposed requirements on network operators to be able to determine the position of mobile devices engaged in emergency calls. For instance, the so called E911 requirements in the United States mandate that it must be possible to determine the position of a certain percentage of all emergency calls placed from wireless devices. These requirements do not distinguish between indoor and outdoor environments.

In many environments, position can be accurately estimated by using positioning methods based on the Global Positioning System (GPS). However, GPS-based positioning often provides unsatisfactory performance in certain urban and/or indoor environments. Complementary and/or alternative network-based and network-assisted positioning methods are known. For example, the wireless network provides location assistance information for assisting positioning based on Global Navigation Satellite System, GNSS, signals referred to as Assisted GNSS or A-GNSS. Such assistance data allows wireless devices to use GPS to determine their location in operating environments where GPS-based positioning would not otherwise work or at least would not yield satisfactory results.

Additionally or alternatively, networks may perform uplink, UL, and/or downlink, DL, based positioning. These methods of positioning generally rely on the known, fixed positions of radio nodes within the network, and use cell identifiers and signal measurements for determining the positions of wireless devices operating within the network. Example measurements include Observed Time Difference of Arrival, OTDOA, measurements and such network implement positioning techniques based on such measurements.

Positioning-related measurements may be performed on DL signal and/or on UL signals. In the DL case, initial measurements are taken with respect to one or more DL signals received at a given mobile device, and the mobile device carries out positioning calculations based on the initial measurements, or provides measurement information to the network, for ultimate determination of position. In the UL case, the network makes UL signal measurements and determines the position of the involved mobile device based on those measurements. Certain challenges are encountered in the UL case, however.

For example, UL-based positioning as conventionally practiced has a heavy dependency on the involved network nodes and that limits its application. Further, according to current network standards, such as those promulgated by the Third Generation Partnership Project, 3GPP, for Long Term Evolution, LTE, networks, UL-based positioning is not available via user-plane signaling. Thus, current implementations of UL-based positioning in such networks rely on control-plane signaling. Still further, some of the parameters currently required for UL-based positioning are not efficiently signaled between the relevant nodes within the network, or simply are not available from such nodes in a timely fashion.

SUMMARY

In one aspect, methods and apparatuses disclosed herein improve positioning based on UL signals in a wireless communication network, by sending UL transmission configuration from wireless devices, and by using that information in the network for performing UL-based positioning of the devices. In this regard, the teachings herein advantageously recognize that obtaining UL transmission configuration information from the wireless devices themselves represents a more efficient, complete and richer mechanism for obtaining parameters relevant to configuring and performing UL-based positioning operations. As a further example advantage, the teachings herein provide for control-plane and/or user-plane signaling of UL transmission configuration information, which comprises, for a given wireless device, at least one of resource allocation information for one or more UL transmissions for the wireless device, and UL signal characteristics information.

In one embodiment, a method at a wireless device supports UL-based positioning of the wireless device by a wireless communication network. The method includes detecting a positioning event trigger for UL-based positioning, or receiving a request from a positioning node in the network for UL transmission configuration information. The method further includes responding to the request or trigger by sending UL transmission configuration information to the positioning node. Advantageously, the UL transmission configuration information sent to the positioning node includes resource allocation information for one or more UL transmissions for the wireless device and/or UL signal characteristics information.

In a related embodiment, a wireless device is configured for operation in a wireless communication network and includes a communication interface and one or more processing circuits. The communication interface is configured for communicating with the network, and the one or more processing circuits are configured to communicate with a positioning node in the network via the communication interface, and to support UL-based positioning of the wireless device by the network. To provide that support, the one or more processing circuits are configured to receive a request from the positioning node for UL transmission configuration information or detect a positioning event trigger for UL-based positioning. The use of "or" in the preceding sentence will be understood as being non-exclusive, meaning that the contemplated wireless device may perform either or both actions of detecting and receiving, e.g., at different times or under different circumstances.

Further, the one or more processing circuits are configured to respond to the request or trigger by sending UL transmission configuration information to the positioning node. Advantageously, the UL transmission configuration includes resource allocation information for one or more UL transmissions for the wireless device and/or UL signal characteristics information.

In a complementary embodiment, a positioning node is configured for operation with a wireless communication network and it includes one or more communication interfaces and associated protocol processing configured for communicating with one or more other nodes in the network and with wireless devices operating in the network. The positioning node further includes one or more processing circuits that are operatively associated with the communication interface(s) and are configured to receive UL transmission configuration for a wireless device operating within the network. The received UL transmission configuration information includes resource allocation information for one or more UL transmissions for the wireless device and/or UL signal characteristics information for the wireless device. The positioning node advantageously uses that information to configure an UL measurement, for UL-based positioning of the wireless device. That is, the positioning node configures an UL measurement by the positioning node or by an associated Location Measurement Unit, LMU, according to the resource allocation information and/or the UL signal characteristics information.

A corresponding method at a positioning node includes receiving UL transmission configuration information for a wireless device operating within a wireless communication network. The received UL transmission configuration information includes resource allocation information for one or more UL transmissions for the wireless device and/or UL signal characteristics information, for the wireless device. The information is received based on a positioning event trigger being detected at the wireless device, or based on the positioning node requesting the information. The method further includes the positioning node configuring an UL measurement by the positioning node or by an associated LMU, according to the resource allocation information and/or the UL signal characteristics information, for UL-based positioning of the wireless device.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
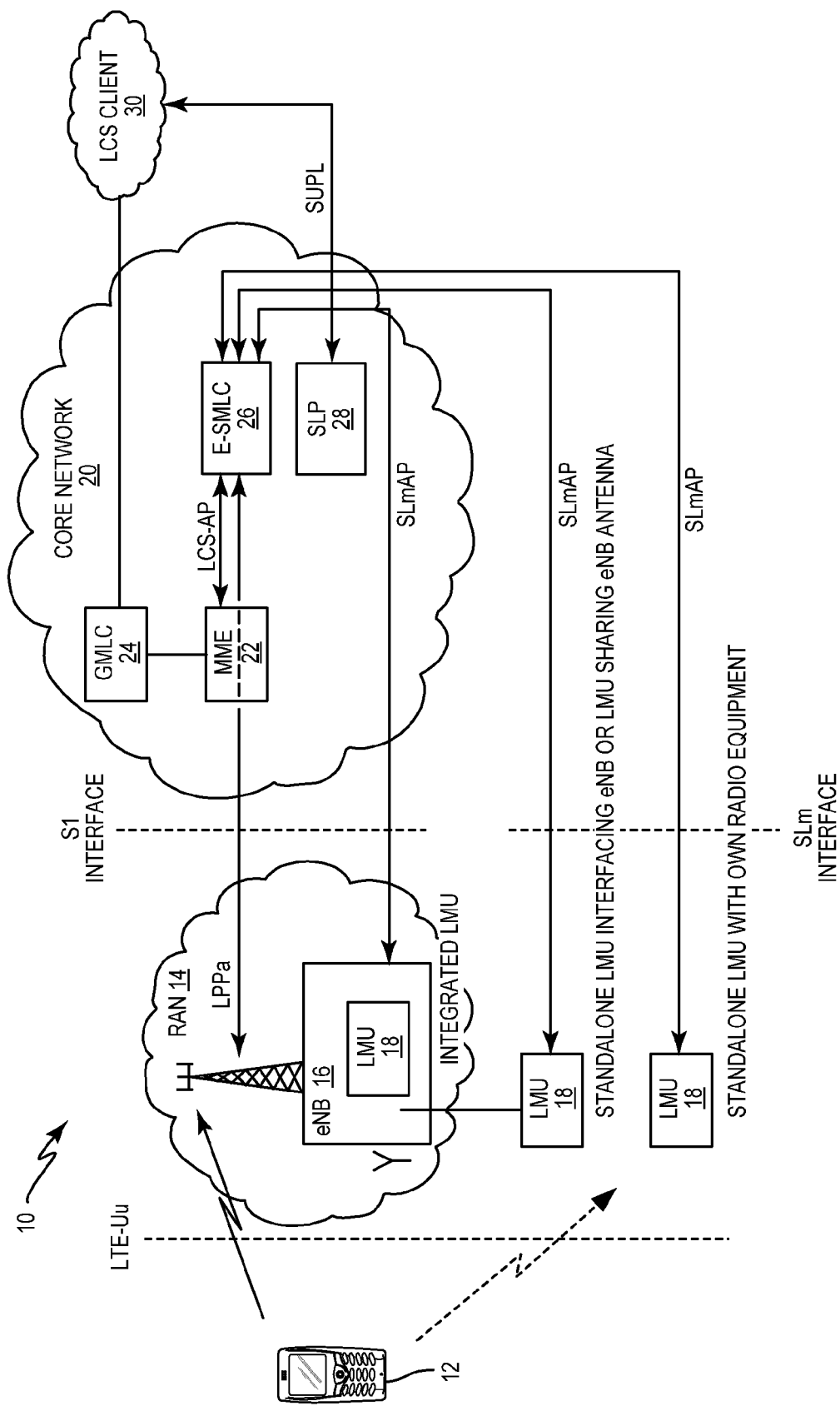
FIG. 1 is a block diagram of one embodiment a wireless communication network, including a positioning node and wireless device configured according to the teachings herein.

FIG. 1 illustrates one embodiment of a wireless communication network 10, which is configured for Uplink, UL, based positioning, in the example case of Long Term Evolution, LTE. The network 10 provides communication services for a potentially large number of wireless devices 12, although for convenience the diagram depicts only one such device. The wireless device 12 may be understood as a type of User Equipment or UE, at least in the context of 3GPP networks, where "3GPP" denotes the Third Generation Partnership Project. Broadly, the terms "UE" and "wireless device" may be understood in a general sense to encompass essentially any device or node configured for operation within the network 10 and equipped with a corresponding radio interface, including without limitation Personal Digital Assistants, laptops, mobile devices or terminals such as smart phones, tablet devices, sensors, and fixed or mobile relays, such as small Radio Base Stations, RBSs, which are often referred to as femto or pico BSs.

A Radio Access Network, RAN, 14 provides an LTE-Uu interface for transmitting signals to the wireless device 12 and for receiving signals from the wireless device 12. The RAN 14 includes one or more base stations 16, referred to as eNBs in the LTE context. The RAN 14 further includes one or more Location Measurement Units, LMUs, 18. An LMU 18 is a physical or logical node within the RAN 14 that is configured to perform positioning-related measurements. An LMU 18 may be implemented with or integrated into an eNB 16, or may be implemented as a standalone node within the RAN 14, and may include its own antennas for receiving signals on which it performs positioning-related measurements. For example details regarding LMUs 18, the interested reader may refer to the technical specification identified as 3GPP TS 36.111 Version 11.0.0 Release 11: *Location Measurement Unit (LMU) performance specification; Network Based Positioning Systems in E-UTRAN*.

The network 10 further includes a Core Network, CN, 20, which in the illustrated LTE context has an "S1" interface with the RAN 14. Like the RAN depiction, the CN depiction is simplified for ease of discussion and to better focus on example positioning-related details. Thus, the illustrated CN 20 includes a Mobility Management Entity, MME, 22, a Gateway Mobile Location Center, GMLC, 24, an Enhanced Serving Mobile Location Center, E-SMLC, 26, and an SLP 28, where SLP denotes Secure User Plane Location Platform. Further, there may be one or more location services clients 30, e.g., external location-services servers that may be associated with third parties offering location-based services for the wireless devices 12.

Regardless, in the context of FIG. 1, the wireless device 12 is configured to support UL-based positioning by transmitting UL transmission configuration information to the network 10, where that UL transmission configuration information includes resource allocation information for one or more UL transmissions for the wireless device and/or UL signal characteristics information for the wireless device 12. Correspondingly, a positioning node within the network 10 e.g., node 26 and/or 28, is configured to configure an UL measurement by the positioning node or by an associated measuring node, such as an LMU 18, according to the resource information and/or the UL signal characteristics information, for UL-based positioning of the wireless device 12.

Although UL measurements in the above context may in principle be performed by any radio network node, e.g., by eNBs 16, the depicted positioning architecture includes one or more LMUs 18, for use in UL-based positioning. One sees an SLm interface between the E-SMLC 26 and the LMUs 18, for use in uplink positioning. The interface is terminated between a positioning server, here, the E-SMLC, and each LMU 18, and it is used to transport the SLmAP protocol, which has been developed for conveying UL positioning messages. Further, the LTE Positioning Protocol A, LPPa, is a protocol between eNBs 16 and a Location Services, LCS, server, e.g., the E-SMLC 26. LPPa is specified only for control-plane positioning procedures, although it still can assist user-plane positioning by querying eNBs 16 for information and eNB measurements. LPPa may be used for DL positioning and UL positioning and for example information the interested reader may refer to 3GPP TS 36.455 Version 11.2.0 Release 11: *LTE; Evolved Universal Terrestrial Radio Access (E-UTRA); LTE Positioning Protocol A (LPPa)*.

While LPPa is between eNBs 16 and an LCS server, the LTE Positioning Protocol, LPP, is used to establish sessions between a location server and the target device being positioned, e.g., a wireless device 12 operating within the network 10. Such sessions are used to obtain location-related measurements, a location estimate, or to transfer assistance data. For example details of the LTE Positioning Protocol, LPP, see 3GPP TS 36.355 Version 11.2.0 Release 11: *LTE; Evolved Universal Terrestrial Radio Access (E-UTRA); LTE Positioning Protocol (LPP)*. For discussion purposes here, it is enough to note that LPP can be used both in the control and user planes, such as in the context of SUPL, and to note that is contemplated herein in one or more embodiments to use LPP for a positioning node requesting UL transmission configuration information from a wireless device 12, and a wireless device 12 sending UL transmission configuration information to a positioning node.

One type of UL-based positioning relies on Uplink Time Difference of Arrival measurements, referred to as U-TDOA measurements. In LTE networks, such measurements involve relative time of arrival determinations for uplink signals, referred to as U-RTOA. Such measurements are performed on UL Sounding Reference Signals, SRSs, transmitted from a given wireless device 12. To detect an SRS signal, an LMU 18 needs a number of SRS parameters to generate the SRS sequence, which then has be correlated against received UL signals. The SRS parameters used for generating the SRS sequence and determining when SRS transmissions occur might, for example, be provided in assistance data transmitted from a positioning node to the LMU 18.

For example, the E-SMLC 26 provides such assistance data via SLmAP. However, these parameters generally are not known to the positioning node, which therefore must first obtain the information from the eNB 16 that configured the SRS parameters for the wireless device 12. The eNB 16 could provide such information to the E-SMLC 26 using LPPa, for example. But note that such a scenario represents a non-limiting example case that illustrates the signaling efficiency improvements gained through the teachings herein. That is, according to an embodiment of the teachings herein, a positioning node receives UL transmission configuration information for a wireless device 12, where the received information comprises or includes the SRS parameters needed for UL positioning. The positioning node, e.g., the E-SMLC 26, uses such parameters directly and/or it configures one or more positioning measurements according to them, e.g., by providing the SRS parameters to an LMU 18, which uses them to detect and measure the corresponding SRS.

Thus, one aspect of the teachings herein relate to methods in the network 10 for enabling enhanced UL positioning support via wireless devices 12. Here, the term "enhanced" denotes the more efficient and/richer sourcing of UL transmission configuration from the wireless devices 12 themselves. In one or more embodiments, a wireless device 12 provides a positioning node with UL transmission configuration information for use in configuring UL positioning, e.g., for UTDOA-based positioning. In one example, the wireless device 12 signals its UL transmission configuration information via control plane signaling. In another example, the wireless device 12 signals the UL transmission configuration information via user plane signaling.

In a particular example, the wireless device 12 is configured to signal the UL transmission configuration information to the positioning node via LPP or LPPe protocol. In yet another example, the wireless device 12 signals the UL transmission configuration information to the positioning node via SUPL, where the user-plane communication may comprise communication via a user-plane data channel that further comprises an IP link carried by a user plane of the network 10.

The UL transmission configuration information in one or more embodiments comprises any one, or any combination, of the following: UE-specific configuration information, UE-group specific configuration information, or cell-specific configuration information. In one example, the UL transmission configuration information is an indication of an on-going or scheduled UL transmission, which may be a pre-defined transmission. In another embodiment, the information may also comprise one or more UL transmission configuration parameters. The parameters may be any one or more of the following types: parameters describing time and/or frequency resources, such as frequency, bandwidth, subcarriers, resource blocks, subframes, radio frames, time slots, symbols, etc., for scheduled UL transmissions; parameters describing time and/or frequency resources for scheduled but muted UL transmissions; power-related parameters such as transmit power, power back off, power boosting, maximum power indications, e.g., in the form of a UE category indication; and parameters indicating one or more characteristics of the UL signal(s) transmitted by the wireless device 12.

The UL signal characteristics to be indicated by the wireless device 12 may be chosen by the wireless device 12, by the network 10, or by default, or otherwise according to a defined rule known to the network 10 and the wireless device 12. Example signal characteristics parameters include a number used by the wireless device 12 for generating the UL signal sequence, which is selected by the wireless device 12 from a set of pre-configured numbers, or from a set of numbers received from another node, or from a set of numbers generated by a pre-defined rule. Another example characteristic parameter is a scrambling code, or any code used to generate/transmit the UL signal(s) from the wireless device 12. Yet another UL signal characteristic parameter is a temporary number assigned by the network 10, such as a Radio Network Temporary Identifier, RNTI. Other examples include a cell RNTI, denoted as C-RNTI, and/or a random access RNTI, denoted as an RA-RNTI.

Still further, the UL transmission configuration information additionally or alternatively includes any one or more of the following: the wireless device's transmit antenna configuration, such as the number or set of transmitting ports; the transmit beam configuration; the antenna type, e.g., omni-type or directional; the antenna and/or device orientation with respect to a pre-defined direction or a reference direction, e.g., strictly vertical to the earth surface, compass direction or a direction towards a reference receiver; the frequencies and RATs currently possible to use for UL positioning, including UL component carriers currently configured for carrier aggregation; inter-RAT timing information, such as the relation of the system time, e.g., a System Frame Number, SFN, of different mobile networks; and device capability information related to UL transmissions and/or UL positioning. The system time/SFN information includes, for example, information regarding any one or more of the following RATs: WCDMA, CDMA, GSM, LTE FDD, LTE TDD, and/or WiFi.

The device capability information may be provided via LPP or LPPe and may comprise an indication of support for UL positioning or UTDOA conveyed in a "ProvideCapabilities" message. Here, it should be noted that "conventional" LPP contains no information related to UL-based positioning—see 3GPP TS 36.355. That is, LPP has heretofore not been used to request and send UL transmission configuration information as taught herein.

In at least one embodiment taught herein, a wireless device 12 sends device capabilities and/or other UL transmission configuration information to a positioning node, e.g., to an E-SMLC 26, responsive to the positioning node sending a request for that information to the wireless device 12. Additionally or alternatively, the wireless device 12 may send capability information indicating the ability of the wireless device 12 to support or assist in UL positioning.

It will be understood that at least certain elements of the UL transmission configuration information generally relate to particular UL transmissions by the wireless device 12, e.g., current or scheduled UL transmissions, to which the certain elements apply. The UL transmission(s) can be essentially any type of transmission. Examples include any one or more of the following UL transmissions by the wireless device 12: a reference signal transmission, such as SRS transmissions, or a demodulation reference signal, DMRS, transmission in LTE; a random access transmission, such as a Physical Random Access Channel, PRACH, transmission in LTE; a control channel transmission, such as a Physical Uplink Control Channel, PUCCH, transmission in LTE; or a data channel transmission, such as a Physical Uplink Shared Channel, PUSCH, transmission in LTE.

An example UL signal transmission for UL positioning LTE is SRS. Corresponding example SRS parameters sent in UL transmission configuration information include any one or more of the following items: cell-specific SRS bandwidth configuration, e.g., srs-BandwidthConfig as described in 3GPP TS 36.211; UE-specific SRS bandwidth configuration, e.g., srs-Bandwidth as described in 3GPP TS 36.211; number of antenna ports for SRS transmission, e.g., srs-AntennaPort as described in 3GPP TS 36.211; SRS frequency domain position, e.g., as described in 3GPP TS 36.211; SRS frequency hopping bandwidth configuration, e.g., as described in 3GPP TS 36.211; SRS cyclic shift, e.g., as described in 3GPP TS 36.211; transmission comb configuration, e.g., as described in 3GPP TS 36.211; SRS configuration index, e.g., as described in 3GPP TS 36.213; MaxUpPts used for TDD, as described in 3GPP TS 36.211; an indication of whether group hopping is enabled, e.g., as described in 3GPP TS 36.211; and any parameter or parameters describing the signal sequence, e.g., deltaSS as described in 3GPP TS 36.211, 5.5.1.3, which is used when SRS sequence hopping is used.

In the same or other embodiments, the UL transmission configuration information sent from the wireless device 12 includes cell-specific parameters, where such parameters can be understood as "describing" in some sense the corresponding UL transmission(s) from the wireless device 12. Non-limiting example parameters include any one or more of the following items: Physical Cell Identity or PCI; cell UL frequency information or EUTRA Absolute Radio Frequency Channel Number, EARFCN; cell UL cyclic prefix; and cell UL system bandwidth. Note that cell identification information, such as PCI, may be used for generating signal sequences and also may indicate or have a known association with time and/or frequency resources allocations for the cell, which means that such information can be used by the positioning node to infer time/frequency information for the UL transmissions from the wireless device 12. Of course, such information may be provided in the context of multi-cell transmissions, e.g., for wireless devices 12 operating in a Carrier Aggregation, CA, mode, or operating with multiple cells or links in the same or different frequencies in an UL Coordinated Multipoint, CoMP, context.

Further, in at least some embodiments, the UL transmission configuration sent from the wireless device 12 to the positioning node includes certain proximity information. Such information indicates, for example, the proximity of the wireless device 12 to particular radio nodes within the network 10, e.g., particular eNBs 16. Proximity information also may be reported relative to WiFi access points or other hotspots, and also may be reported relative to other wireless devices 12 operating within the network 10.

Proximity information allows a number of UL signal parameters or characteristics to be inferred or at least broadly characterized by the positioning node. For example, knowing the proximity of a wireless device 12 relative to its serving base station, e.g., serving eNB 16, allows the positioning node to at least generally estimate the transmit power of the UL signals from the wireless device 12. Of course, some embodiments herein contemplate that UL transmit power is included as an explicit parameter in the UL transmission configuration information.

In any case, proximity information may comprise, for example, any one or more of the following items: radio node type, radio node location, and timing measurements. Example radio node types include WiFi, 3GPP macro eNB, 3GPP femto eNB, and Closed Subscriber Group, CSG, access point. Radio node location information may be received by the wireless device 12 via broadcast or dedicated signaling from the network 10. Here, it should be noted that the terms "radio node" or "radio network node" as used herein have a broad definition, which includes but is not limited to base stations, relay stations, other wireless devices 12, etc., within the network 10. Example timing measurements include Round-Trip-Time or RTT, Timing Advance or TA, and Receive/Transmit, RX/TX, propagation delay or distance. Such measurements may be taken with respect to a given radio node or nodes.

From the perspective of the positioning node, this disclosure contemplates various advantageous uses of the UL transmission configuration information for enhancing positioning operations. For example, the UL transmission configuration information described herein is received by the positioning node and used for configuring UL positioning measurements made by the positioning node or made by a measuring node. In one example, the measuring node is an eNB 16. In another example, the measuring node is an LMU 18, which may be part of an eNB 16 or a standalone node. The positioning node in this example case receives UL transmission configuration information for a given wireless device 12, or for multiple wireless devices 12, and provides at least a portion of the UL transmission configuration information to the measuring node as UL measurement assistance data. In turn, the measuring node uses the assistance data to configure one or more positioning-related measurements.

As for the wireless device 12 sending the UL transmission configuration information, several mechanisms are contemplated herein, which mechanisms may be used in different embodiments, or in the same embodiment at different times or in different scenarios. In at least one embodiment, the wireless device 12 is configured to send the UL transmission configuration information responsive to a positioning request from the positioning node, e.g., in an LPP or LPPe message. Additionally or alternatively, the positioning request may be received from another layer, e.g., from an application running in the positioning device 12. Still further, the wireless device 12 in one or more embodiments is configured to send UL transmission configuration information periodically and/or in an event-triggered manner, e.g., upon reconfiguration of the UL transmission used for positioning, or upon entering a new cell or a new local area or a tracking area.

In the same or other embodiments, the wireless device 12 is configured to determine whether its UL transmission configuration is sufficient for positioning, e.g., to determine whether a scheduled UL transmission is sufficient for a given positioning event subject to given positioning requirements—e.g., timing, accuracy. When UL signals are not scheduled or are insufficient as determined by the wireless device 12 for UL positioning, the wireless device 12 may request configuration or reconfiguration of its UL signals from a configuring node, e.g., from an eNB 16, or from another network node, e.g., the positioning node. Additionally or alternatively, the wireless device 12 may be configured to indicate a need for UL transmissions for positioning to the configuring node or other network node, such as the positioning node. The request or indication may be signaled, e.g., via the Radio Resource Control or RRC protocol.

The wireless device 12 in one or more embodiments is configured to determine whether its UL transmission configuration is sufficient for positioning based on one or more of: a comparison with a pre-defined reference configuration, e.g., based on standardized requirements and/or pre-configured configuration information in the wireless device 12; a target positioning measurement quality, such as measurement time or measurement accuracy; a target positioning Quality of Service or QoS, such as position horizontal uncertainty, vertical uncertainty, and confidence level; device speed; UL frequency; and environment type.

With respect to the above, it should be noted that propagation conditions typically degrade with increasing signal frequency and that environment types may include indoor/outdoor, macro area or a local area. It should also be noted that a reference configuration stored in the wireless device 12 for comparison purposes may be defined in terms of UL bandwidth, the number of UL transmissions, and/or the number of resource elements in frequency used for the UL transmission.

On the network side, the UL transmission configuration information obtained for a given wireless device 12, or obtained for given groups of wireless devices 12, may be used by the positioning node for positioning the wireless device(s) 12 for which the UL transmission configuration information was obtained, for collecting configuration statistics and learning the network configuration, for (re)selecting positioning methods, for configuring positioning measurements, and/or for selecting measuring nodes, such as LMU 18 selection, etc. In at least one embodiment, the UL transmission configuration information is stored and used for DL positioning or hybrid positioning, in addition to using it for UL-based positioning, which can include its use in hybrid positioning involving UL measurements.

Also, as noted earlier herein, the UL transmission configuration information obtained for a given wireless device 12 may include inter-RAT UL transmission configuration information for the wireless device 12. Such data comprises, for example, UL transmission configuration information about an UL transmission in a different RAT, e.g., a scheduled UL transmission by the wireless device 12 using another RAT that is different than the RAT used for reporting the UL transmission configuration information.

In an example embodiment, the network 10 is an LTE Frequency Division Duplex, FDD, network, and represents the primary RAT for the wireless device 12. The positioning node in this example case uses the network 10 to obtain UL transmission configuration information from the wireless device 12 for UL transmissions by the wireless device 12 in a second RAT. The second RAT may be any one of the following RATs: LTE Time Division Duplex, TDD; WCDMA, GSM, Wireless LAN, WLAN, etc. The UL transmission configuration information may be provided via LPP, LPPe, or in a container that is transparent to the primary RAT. In any case, the positioning node uses the obtained UL transmission configuration information to facilitate positioning of the reporting wireless device 12 and/or one or more other wireless devices 12. It is also contemplated that a wireless device 12 may use a first RAT to report UL transmission configuration information for a second RAT, where the second RAT is LTE FDD.

In one example of operation with two or more RATs, the wireless device 12 operates in a carrier aggregation configuration that aggregates carriers from two RATs. In another example, the wireless device 12 is configured for communicating with both LTE and WiFi networks with seamless or non-seamless WLAN off-loading. See 3GPP TS 36.402, V11.2.0, for example details. In another example, the wireless device 12 establishes a data communication link, e.g., for user-plane communication, in a first RAT but transmits physical signals that have characteristics of a second RAT. These signals may have the same or different time and/or frequency resources as used in the first RAT, and they may be transmitted using a second RAT or using the same RAT as used for reporting but to a different RAN. However, the wireless device 12 may not need to connect to the second RAT while transmitting the physical signals with the second-RAT characteristics. Further, it will be appreciated that the wireless device 12 in at least some configurations does not operate in two or more RATs at the same time.

In another aspect of the teachings herein, the UL transmission configuration information of interest may comprise "multi-user" UL transmission configuration information, such as information for a specific group of wireless devices 12. A group may be cell-specific, for example. Thus, the positioning node may receive UL transmission configuration information that is device-specific and/or group-specific. Further, in at least one embodiment, the contemplated positioning node is configured to combine the UL transmission configuration information received from multiple wireless devices 12, which may entail combining device-specific and group-specific information.

In the same or another embodiment, the contemplated positioning node is configured to combine the UL transmission configuration information received for a given wireless device 12, or devices 12, with configuration information received from an eNB 16 or other network node. For example, the positioning node combines UL transmission configuration by merging or joining the information received from a wireless device 12 and from the network node that configured the wireless device 12, e.g., a serving eNB 16. In such instances, the positioning node may perform a type of information merging wherein, for overlapping parts of the UL transmission configuration information being merged, the most recent information is retained. That is, if the UL transmission configuration information received from a configuring node includes one or more of the same parameters or information elements as are received from the corresponding wireless device 12, the positioning node will retain the most recent copy of the overlapping information.

The positioning node is further configured in one or more embodiments to collect and analyze multiple copies of UL transmission configuration information received for the same or different wireless devices 12 and, based on the known positions of those devices, combine the UL transmission configuration information of wireless devices 12 in certain logical/geographical areas. Thus, the positioning node may configure positioning-related measurements in common for all such wireless devices 12.

The positioning node also may be configured to collect and analyze UL transmission configuration information as received for multiple wireless devices 12, e.g., over time, to identify wireless devices 12 of the same type or capability, e.g., having the same traffic/service types. Further in such embodiments, the positioning node may combine the UL transmission configuration information of like wireless devices 12 and/or configure positioning-related measurements in common for all such like wireless devices 12, e.g., based on the combined UL transmission configuration information.

Similar identifying, combining, and configuring operations can be based on the positioning node recognizing those wireless devices 12 that are served from the same node and/or are operating in the same cell(s) within the network 10. For example, in one or more embodiments, the positioning node identifies or derives an UL transmission configuration that is "typical" for the wireless devices 12 being served from the same node and/or operating in the same cell(s) and uses that typical configuration to configure UL-based positioning measurements for all such wireless devices 12.

As such, in one or more embodiments herein, the positioning node is configured to determine a common or a typical UL transmission configuration for all of or a group of wireless devices 12 in a cell, e.g., a common or a typical configuration may be determined based on the collected statistics, e.g., regarding UL bandwidth, UL transmission periodicity, UL resource allocation densities and/or frequencies, or based on detecting common or typical parameter settings for the wireless devices 12, e.g., determining a parameter setting used for x-percent of the reporting wireless devices 12 in a given cell or area.

A cell-specific configuration is another example of a common UL transmission configuration, which may be commonly assumed for all wireless devices 12 or for a certain group of wireless devices 12. It is therefore sufficient for the positioning node 12 to receive UL transmission configuration from just one such wireless device 12, as that device is representative of the others. In that regard, the positioning node can be understood as configuring a positioning-related measurement for multiple wireless devices 12, according to the UL transmission configuration information received from a representative one, or ones, of such devices.

A cell-specific or a group-specific UL transmission configuration may be a super set of the UL transmission configuration of a specific wireless device 12. That is, a device-specific UL transmission configuration information may be used to supplement configuration details already known, e.g., for the serving cell of the device. Thus, the positioning node or an associated measurement node may use the device-specific information in a supplemental or additional sense, e.g., for increasing the number of samples available for measurement, but the node would still be able to measure at least on cell-specific resources without knowing additional device-specific resources.

Group-specific UL transmission configurations also may be associated or correlated with a geographical or a logical area, e.g., described by an LCS shape, such as a polygon or a circle, or associated with an identifier such as cell identifier, tracking area ID, local area ID, etc. More generally, in one or more embodiments, the positioning node may be configured to configure such an UL-based positioning measurement made by it or an associated measuring node, for a given wireless device 12, based on UL transmission configuration information that is known to be associated with or representative of the given wireless device 12. Such information, however, is not necessarily received directly from the wireless device 12.

For example, the positioning node may use UL transmission configuration information obtained for a group of wireless devices 12 and configure positioning-related measurements for a given wireless device 12 in the group based on the UL transmission configuration information obtained for the overall group. Such operation can be understood as the positioning node operating with multi-user UL transmission configuration information, or be understood as the positioning node using the same, overlapping or similar UL transmission configuration information to configure positioning related measurements for more than one wireless device 12.

In one example of such operation, the positioning node receives the same or similar UL transmission configuration from more than one wireless device 12 that is determining interference from UL transmissions that are configured for positioning in neighbor cells. The overlapping or similar information in such an example case comprises information about overlapping time and/or frequency resources and/or information regarding transmit UL signal power. Additionally or alternatively, the similar information may relate to positioning QoS, based on a common or typical UL transmission configuration. This type of interference and/or QoS information is used by the positioning node to select the particular LMU(s) 18 that should be used for making positioning measurements with respect to a wireless device 12 for which the common or typical UL transmission configuration is assumed.

The list of proximate radio nodes that is included in the UL transmission configuration information in at least some embodiments can be used to select the closest LMUs 18 or other measuring node(s) for performing UL signal measurements for the wireless device 12. Further, even in instances where the UL transmission configuration information does not explicitly indicate node proximities, similar measurement node selection can be performed based on timing and/or distance measurements that may be indicated in the UL transmission configuration information. Such information additionally or alternatively may be used to configure the search window(s) used for making the UL signal measurements in the network 10.

In a further but related embodiment, the positioning node is configured to evaluate the sufficiency of a representative UL transmission configuration that is applicable to a given wireless device 12 within a given group to which the representative configuration is applied. That is, the positioning node may assume that a common or typical UL transmission configuration applies to a given wireless device 12 and use that representative configuration to configure positioning related measurements for the given wireless device 12 in some cases. However, e.g., for a positioning event that requires a higher positioning QoS, the positioning node may determine that the representative configuration is not sufficient for the contemplated positioning. In such cases, it may obtain the actual UL transmission configuration of the wireless device 12 and configure the positioning measurement(s) accordingly if that actual configuration is sufficient, and otherwise request/initiate reconfiguration, so that the actual UL transmission configuration of the wireless device 12 is sufficient for the contemplated positioning.

In another aspect of the teachings herein, the UL transmission configuration information obtained by the positioning node for a given wireless device 12, or for a given group of wireless devices 12 that have some physical or logical group association, may include timing information that indicates a relation between the timing of the RAN 14 and the timing of the wireless device 12. In one example, the indication relates GPS, GNSS, UTC or another timing reference. In a particular example, the UL transmission configuration information relates GNSS-to-access-network timing and/or relates the timing across two access networks, e.g., across two different RANs 14. Such information may be communicated to the positioning node using LPPa as a non-limiting example, and the positioning node contemplated herein uses such information to enhance its configuration of UL-base positioning measurements for the wireless device 12.

In the same or other embodiments, the positioning node uses radio network node timing information to configure UL measurements for positioning a wireless device 12 according to the UL transmission configuration information applicable to that device. In a particular embodiment, the positioning node obtains such information as part of the UL transmission configuration information received for a particular wireless device 12, or devices 12. That is, the UL transmission configuration information indicates timing information for at least one radio network node, such as one or more of the following parameters: a timing relation between radio network nodes; a timing relation between a radio network node and a reference timing, such as GPS, GNSS, UTC, etc.; a timing relation between a radio network node and a wireless device 12; a timing relation between SFN timing of a cell and the timing of the wireless device 12, which may be GNSS-based; a timing relation between SFN of a cell and a reference timing; and a timing relation between the network 10 and another network or system.

In some embodiments, the positioning node specifically requests such information. Regardless, such a timing relation may be denoted as $[T_{sys1}, T_{sys2}]$, which is a timing information pair containing native timing information of two different wireless systems, e.g., GPS and LTE. In one example, the timing relation $[T_{sys1}, T_{sys2}]$ is measured by the wireless device 12, where $T_{sys1}$ is a GPS native time, e.g., GPSTOW. Further, $T_{sys2}$ is LTE native time, e.g., the start epoch of a certain SFN. The timing relation between the two systems is used by the positioning node in one or more embodiments to deduce the SFN0-GPS time relation experienced by an LMU 18, to facilitate uplink signal measurement by the LMU 18.

In one example of such facilitating, the positioning node carries out a number of processing steps. First, the positioning node calculates the distance d between the wireless device 12 and a radio network node, e.g., the UE-to-eNB distance. The true UE location may be known from, e.g., an AGPS/GPS/OTDOA/UTDOA positioning result or a timing measurement, such as a timing advance, RTT, UE Rx-Tx, propagation delay, etc.

If not known from the first step, the positioning node calculates the propagation delay $t_{propagation}=d/c$ where c is speed of light, and corrects the timing relation to be: $[T_{sys1}+t_{propagation}, T_{sys2}]$. The positioning node considers the propagation delay and this new relation as being expected to be experienced by an involved radio network node e.g., by an eNB 16 in the RAN 14. It is advantageously taught herein in at least one embodiment for the positioning node to use such information for use with UL positioning and to send it to a measuring node, e.g., an LMU 18, for use by the measuring node in configuring its UL signal measurements(s).

In addition to configuring positioning-related measurements based on the UL transmission configuration information, the positioning node may also be configured to use such information for additional purposes. For example, it may build p a database with cell data used for positioning, e.g., E-CID, AECID, pattern matching, RF fingerprinting, UL positioning, UTDOA, hybrid positioning, etc.

Figure 2:
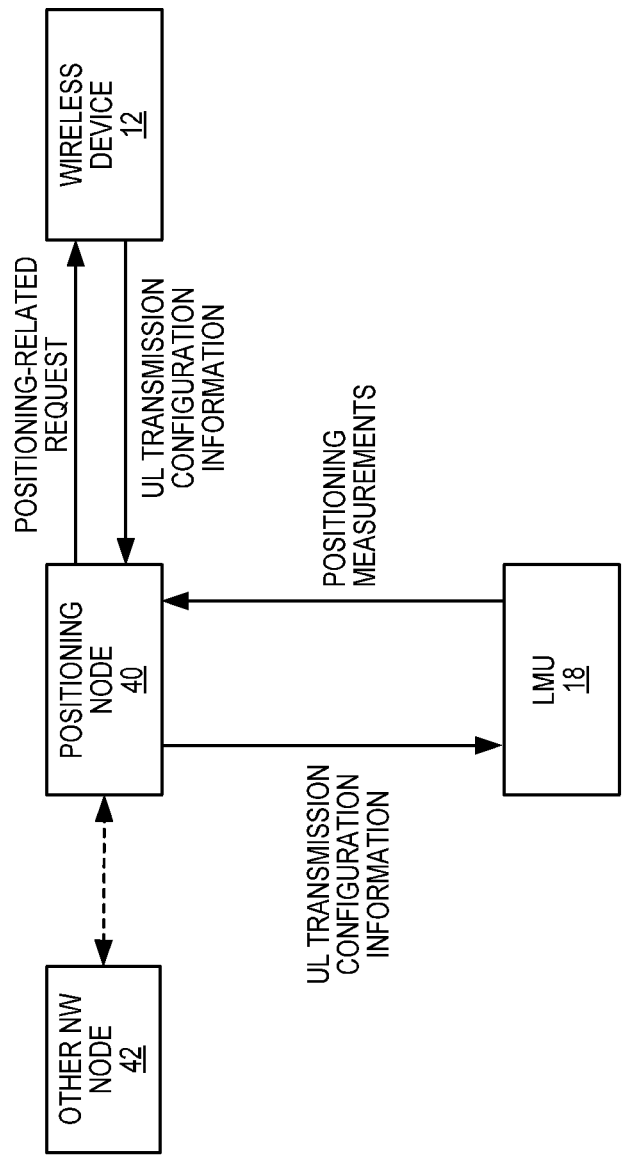
FIG. 2 is a block diagram of one embodiment of signaling between various wireless network nodes and a wireless device, for supporting and performing UL-base positioning of a wireless device.

With the above example embodiments in mind, FIG. 2 illustrates a block diagram showing an example wireless device 12, a positioning node 40, one or more other network nodes 42, and an LMU 18. Here, the positioning node 40 generally represents a positioning node within the network 10, which may be an E-SMLC 26 and/or an SLP 28, for example.

In the example illustration, the positioning node 40 sends a positioning-related request to the wireless device 12, and the wireless device 12 returns UL transmission configuration information to the positioning node 40. The positioning node 40 may share all or a portion of that information with one or more other nodes 42, as suggested in the above examples. In a particular example, the positioning node 40 uses the UL transmission configuration information obtained for the wireless device 12 to configure and/or perform UL-based positioning measurements. For example, it uses the information to select which LMU 18 to use for positioning the wireless device 12 and/or it configures UL-based positioning for the wireless device 12 by providing the selected LMU(s) 18 with at least a portion of the UL transmission configuration, which is used in turn by the LMU(s) 18 to configure one or more positioning-related UL signal measurements with respect to the wireless device 12.

Figure 3:
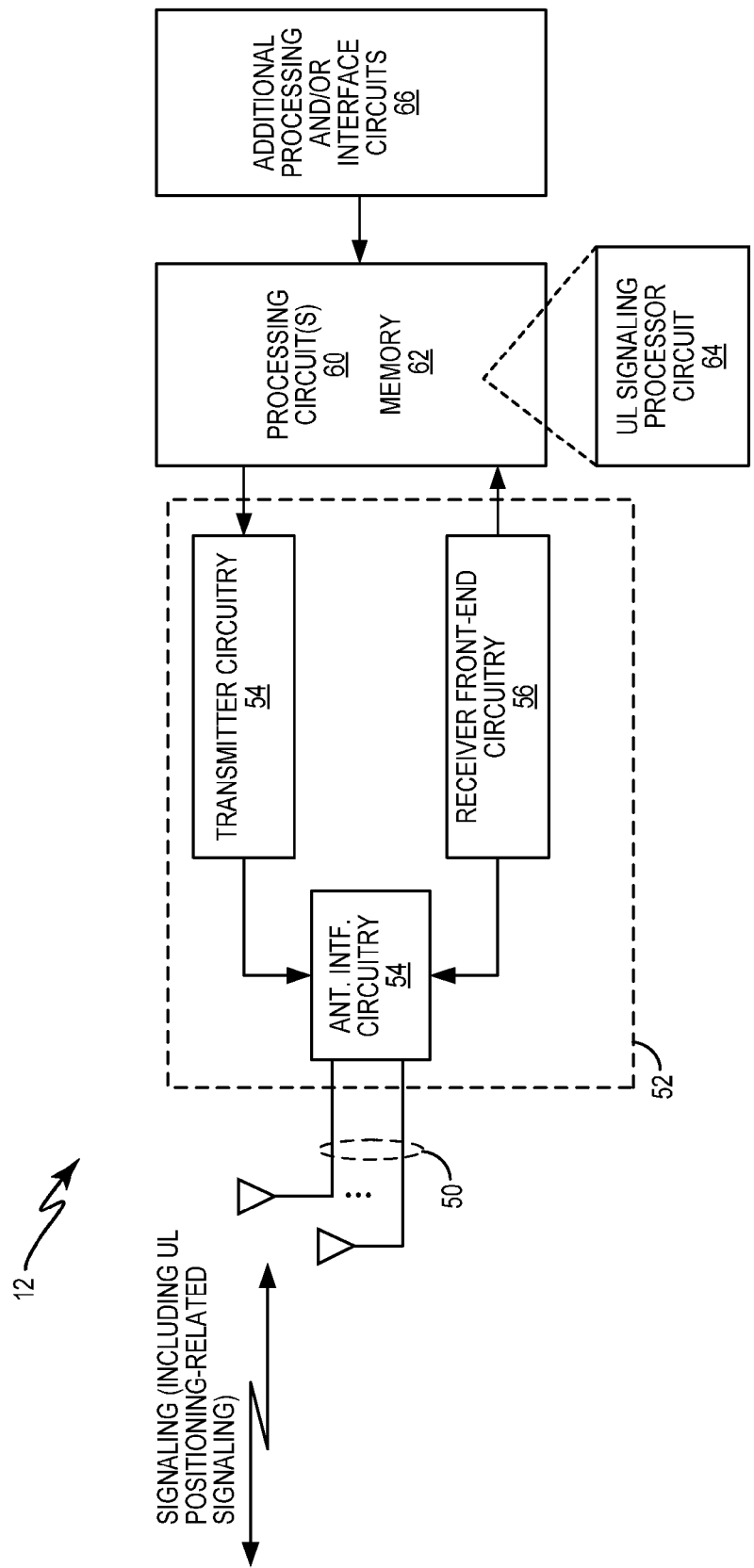
FIG. 3 is a block diagram of example implementation details for a wireless device according to one embodiment.

FIG. 3 illustrates an example embodiment for the wireless device 12, which is configured for operation in the network 10 and comprises one or more transmit/receive antennas 50 and an associated communication interface 52, which is configured for communicating with the network 10. The example communication interface 52 comprises a cellular modem or transceiver, for example, and includes antenna interface circuitry 54, transmitter circuitry 56 for transmitting UL signals to the network 10, and receiver front-end circuitry 58, which provides received signals to one or more processing circuits 60. The one or more processing circuits 60 comprise, e.g., baseband digital signal processors, and include or are associated with one or more memory circuits 62, and which at least functionally include an UL signaling processor circuit 64. The wireless device 12 also may have one or more additional processing and/or interface circuits 66, depending on the features and intended use of the wireless device 12.

The one or more processing circuits 60 are configured to communicate with a positioning node in the network 10 via the communication interface 52. For example, they communicate with the E-SMLC 26 and/or the SLP 28 or, more generically, with some type of positioning node 40. The one or more processing circuits 60 are further configured to support UL-based positioning of the wireless device 12 by the network 10, based on being configured to: receive a request from the positioning node 40 for UL transmission configuration information or detect a positioning event trigger for UL-based positioning; and respond to the request or trigger by sending UL transmission configuration information to the positioning node 40, including at least one of: resource allocation information for one or more UL transmissions for the wireless device 12, and UL signal characteristics information.

In some embodiments, the processing circuit(s) 60 are configured to send at least the resource allocation information as the UL transmission configuration information. Here, the resource allocation information comprises at least one of UL signal bandwidth information and UL scheduling information. Please note that the term "scheduling" as used herein is not limited to scheduling by the eNB 16 or other radio network node, but also encompasses signal muting, for example.

In the same or other embodiments, the one or more processing circuits 60 are configured to send at least the UL signal characteristics information, as the UL transmission configuration information. Here, the UL signal characteristics information comprises at least one of UL transmit power, UL transmission sequence numbers, UL transmission scrambling codes, and base station and/or cell identification numbers associated with UL transmissions by the wireless device 12.

In the same or other embodiments, the processing circuit(s) 60 are configured to send information indicating RAT capabilities of the wireless device 12, as part of the UL transmission configuration information. In this case, or in the previous examples of the UL transmission configuration information contents, the processing circuit(s) 60 are configured to send the UL transmission configuration information as control-plane signaling or as user-plane signaling. Here, as in other instances in this disclosure, the "or" is not mutually exclusive unless noted as such. Consequently, the wireless device 12 may be configured send the UL transmission configuration information as control-plane signaling in certain scenarios, such as in response to certain types of triggering events or requests, and to send the UL transmission configuration information using user-plane signaling in other scenarios. In at least one embodiment, the processing circuit(s) 60 are configured to send the UL transmission configuration information using LPP or LPPe, or using SUPL protocol.

Also, the processing circuit(s) 60 in at least some embodiments are further configured to, in advance of sending the UL transmission configuration information to the positioning node 40, determine whether an UL transmission configuration of the wireless device 12 is sufficient for \ UL-based positioning. Moreover, in response to determining that the UL transmission configuration is not sufficient, the processing circuit(s) 60 are configured to request an updated UL transmission configuration that is sufficient for the UL-based positioning, and are configured to send the updated UL configuration transmission information to the positioning node 40. It will be appreciated that the "sufficiency" of the UL transmission configuration of the wireless device 12 may be evaluated in a number of different ways.

In one embodiment, the processing circuit(s) 60 are configured to determine whether the UL transmission configuration is sufficient for UL positioning by determining whether UL signals that are necessary for the UL-based positioning are scheduled and sufficient for the UL-based positioning. In the same or another embodiment, the positioning circuit(s) 60 are configured determine whether the UL transmission configuration is sufficient for the UL-based positioning based on any one or more of: a comparison of the UL transmission configuration with a pre-defined reference configuration, an evaluation of a target measurement quality associated with the UL-based positioning, an evaluation of a target positioning QoS associated with the UL-based positioning, an evaluation of a speed of the wireless device 12, and an evaluation of UL frequencies or bandwidths associated with the UL transmission configuration. Here, it should be noted that the UL transmission configuration being evaluated for sufficiency may be the current, actual operating configuration of the wireless device 12 or may be the configuration scheduled for a given time relevant to the positioning event for which sufficiency is being evaluated.

Figure 4:
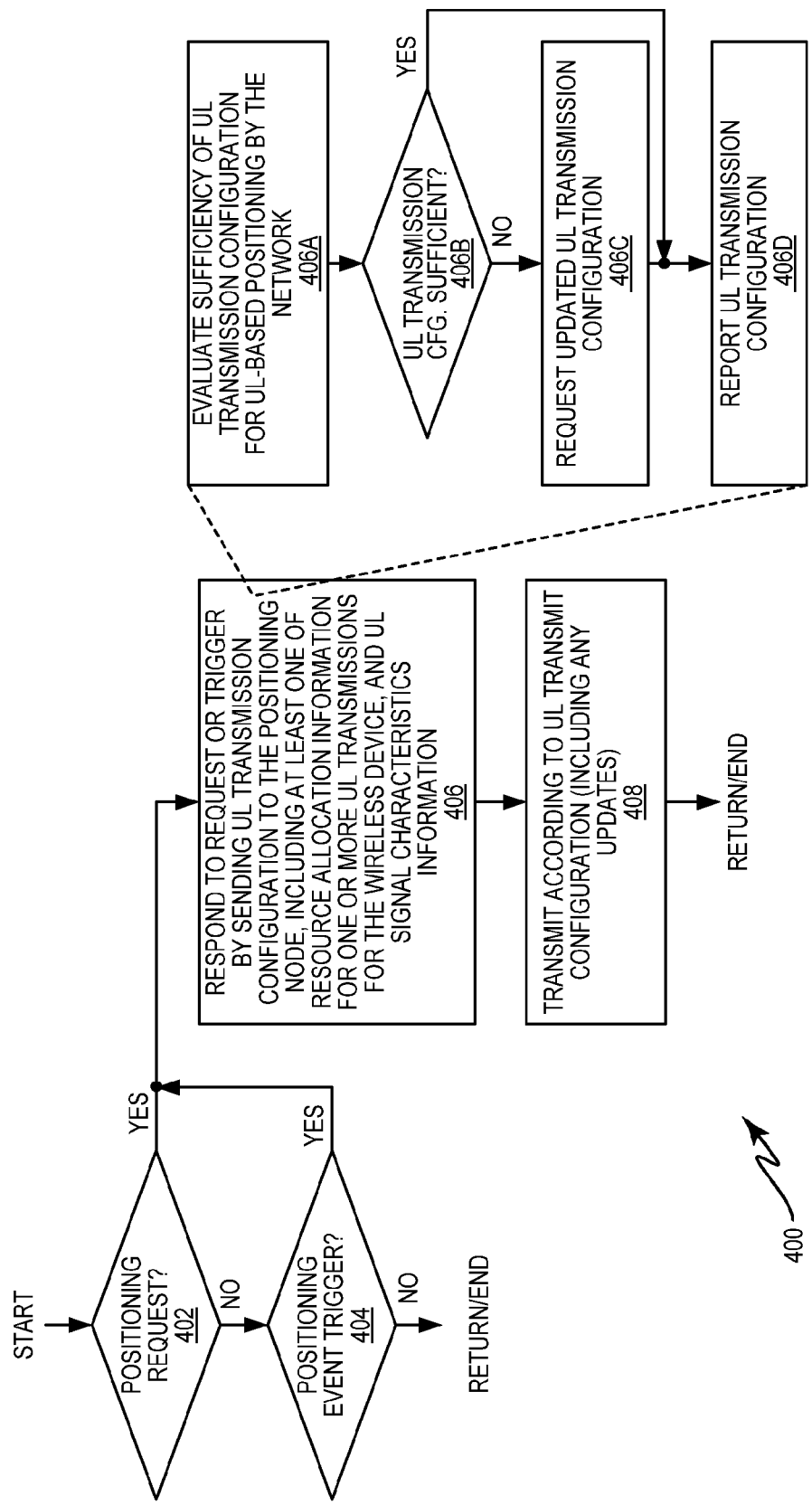
FIG. 4 is a logic flow diagram of one embodiment of a method of processing at a wireless device, for supporting UL-based positioning.

FIG. 4 illustrates a method 400 which corresponds to the above-described processing configuration of the wireless device 12, and it should be understood that the wireless device 12 may be configured to perform the method 400 based on the configuration of fixed and/or programmed circuitry. For example in one or more embodiments, the memory 62 of the wireless device 12 stores computer program instructions, the execution of which by the processing circuit(s) 60 configures the wireless device 12 to carry out the method 400.

According to the example embodiment illustrated, the method 400 includes detecting (Block 404) a positioning event trigger for UL-based positioning, or receiving (Block 402) a request from a positioning node 40 in the network 10 for UL transmission configuration information. The method further includes responding (Block 406) to the request or trigger by sending UL transmission configuration information to the positioning node 40. The UL transmission configuration information includes at least one of: resource allocation information for one or more UL transmissions for the wireless device 12, and UL signal characteristics information. The method further includes the wireless device 12 transmitting (Block 408) according to the UL transmission configuration indicated in the UL transmission configuration information sent to the positioning node 40.

Non-limiting examples of the wireless device 12 transmitting UL signals in accordance with the UL transmission configuration indicated in the UL transmission configuration information includes any one or more of the following: a reference signal transmission, such as an SRS transmission or a DMRS transmission in LTE; a random access transmission, such as a Physical Random Access Channel, PRACH, transmission in LTE; a control channel transmission, such as a PUCCH transmission in LTE; and a data channel transmission, such as a PUSCH transmission in LTE. In any case, it will be understood that the UL transmission configuration as reported by the wireless device 12 and as used to configure/control the transmission in Block 408 will include any configuration updates or changes made in the case that the wireless device 12 determined that the UL transmission configuration for the triggered or requested positioning event was insufficient.

Such operations are shown in the expanded details suggested in the diagram for Block 406—i.e., the details shown in Block 406A, 406B, 406C and 406D. In Block 406A, the wireless device 12 evaluates the sufficiency of its current or scheduled UL transmission configuration with respect to a default or reference configuration, or with respect to one or more specified requirements, which may be expressed in terms of positioning QoS, for example.

If the current or scheduled UL transmission configuration is sufficient (YES from Block 406B), processing continues with reporting the UL transmission configuration via the transmission of UL transmission configuration information to the positioning node 40. However, if the current or scheduled UL transmission configuration is insufficient (NO from Block 406B), processing continues with the wireless device 12 requesting an updated UL transmission configuration (Block 406C). Correspondingly, it will be understood that the UL transmission configuration as reported in Block 406D will include indications of any relevant changes/updates arising from the requested updates of Block 406C.

Figure 5:
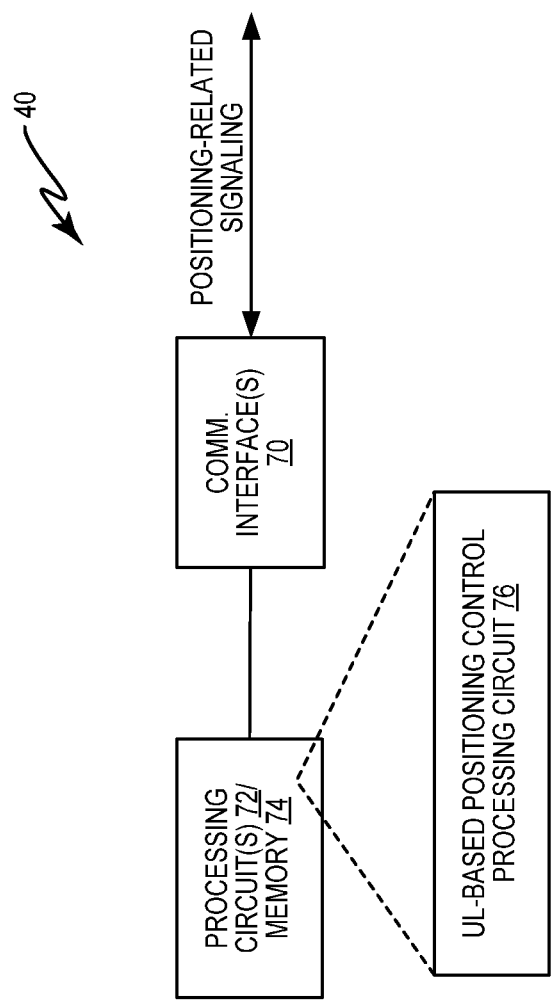
FIG. 5 is a block diagram of example implementation details for a positioning node according to one embodiment.

In a sense complementary to the device and method details shown in FIGS. 3 and 4, FIGS. 5 and 6 illustrate an example positioning node 40 and a corresponding method 600 of positioning node processing. In FIG. 5, one sees a positioning node 40 configured for operation with the network 10. The illustrated positioning node 40 includes one or more communication interfaces 70 and associated protocol processing configured for communicating with one or more other nodes 42 in the wireless communication network 10 and one or more wireless devices 12 operating in the wireless communication network 10. By way of non-limiting examples, the other nodes 42 may be eNBs 16, LMUs 18, O&M nodes, etc.

The example positioning node 40 further includes one or more processing circuits 72, which are operatively associated with the communication interface(s) 70, and includes or is associated with memory 74, which may include multiple types of memory or storage, e.g., volatile and non-volatile storage elements. In the illustrated example, the processing circuit(s) 72 include an UL-based positioning control processing circuit 76, which is configured to request and/or otherwise obtain UL transmission configuration information for given wireless devices 12, and to perform and/or configure one or more UL-based positioning measurements according to such information.

Thus, the processing circuit(s) 72 are configured to receive, e.g., via the communication interface(s) 70, UL transmission configuration information for a wireless device 12 operating within the wireless communication network 10, including receiving at least one of resource allocation information for one or more UL transmissions for the wireless device 12, and UL signal characteristics information for the wireless device 12. Further, the processing circuit(s) 72 are configured to configure an UL measurement by the positioning node 40 or by an associated LMU 28, according to the resource allocation information and/or the UL signal characteristics information, for UL-based positioning of the wireless device 12.

In at least one embodiment, the processing circuit(s) 72 are configured to receive the UL transmission configuration information for the wireless device 12 based on sending a request to the wireless device 12. In another embodiment, or under different circumstances, the one or more processing circuits 72 are configured to receive UL transmission configuration information from the wireless device 12, based on the wireless device 12 sending it in response to a positioning-related trigger event detected by the wireless device 12.

Further, in some embodiments, the one or more processing circuits 72 are configured to receive multiple instances of the UL transmission configuration information for the wireless device 12 and to combine the multiple instances by merging or joining them, and to configure the UL measurement based on the merged or joined instances of the UL transmission configuration information. Additionally, or alternatively, a given wireless device 12 is one among multiple wireless devices 12 and the one or more processing circuits 72 are configured to receive UL transmission configuration information for the multiple wireless devices 12 and to configure UL measurements for UL-based positioning of any one or more of the multiple wireless devices 12, according to the UL transmission configuration information received for the multiple wireless devices 12. For example, the one or more positioning circuits 72 may average common information between multiple reports of UL transmission configuration information from different wireless devices 12 within a same physical or logical grouping or may otherwise combine/merge such reports, for configuring/performing UL-based positioning measurements with respect to those devices.

In an example case, a given wireless device 12 may be considered as a "first" wireless device 12 and the one or more processing circuits 72 receive UL transmission configuration for the first wireless device 12. The one or more processing circuits 72 are configured to receive further UL transmission configuration information for a second wireless device 12 or from another network node 42, and to combine that further UL transmission configuration information with the UL transmission configuration information received from the first wireless device 12, and to configure the UL measurement for the UL-based positioning of the first wireless device 12 according to the combination of UL transmission configuration information.

Further, while this disclosure notes that a wireless device 12 may be configured to evaluate whether its UL transmission configuration is or is not sufficient for UL-based positioning, such functionality may be additionally or alternatively implemented in the positioning node 40. That is, in at least one embodiment, the one or more processing circuits 72 are configured to, in advance of configuring the UL measurement for the UL-based positioning of a given wireless device 12, determine whether an UL transmission configuration indicated by the UL transmission configuration information for the wireless device 12 is sufficient for the UL-based positioning and, if not, to request an updated UL transmission configuration for the wireless device 12.

Also, as noted, the positioning node 40, by virtue of its processing circuit(s) 72, is configured in one or more embodiments to determine, based on the UL transmission configuration information obtained for a given wireless device 12, which LMU 18, from among a number of LMUs (18), is selected to perform one or more UL measurements for UL-based positioning of the wireless device 12.

Still further, in at least some embodiments, a given wireless device 12 may be denoted as a "first" wireless device 12 and the UL transmission configuration information received for the first wireless device 12 is regarded as "first" UL transmission configuration information. The one or more processing circuits 72 are configured to associate a second wireless device 12 with the first UL transmission configuration information and to configure an UL measurement for UL-based positioning of the second wireless device 12, based on the first UL transmission configuration information. This can be understood as an example of the positioning node 40 applying the same UL transmission configuration information to the step of configuring and/or performing UL-based positioning of more than one wireless device 12.

In a broader example, the one or more processing circuits 72 are configured to configure UL measurements for a group of wireless devices 12, based on common UL transmission configuration information determined or assumed for the group of wireless devices 12. In one such embodiment, the processing circuit(s) 72 are configured to determine an UL measurement configuration to be used for given wireless devices 12, based on statistically processing the UL transmission configuration information received from the same or other given wireless devices 12.

Figure 6:
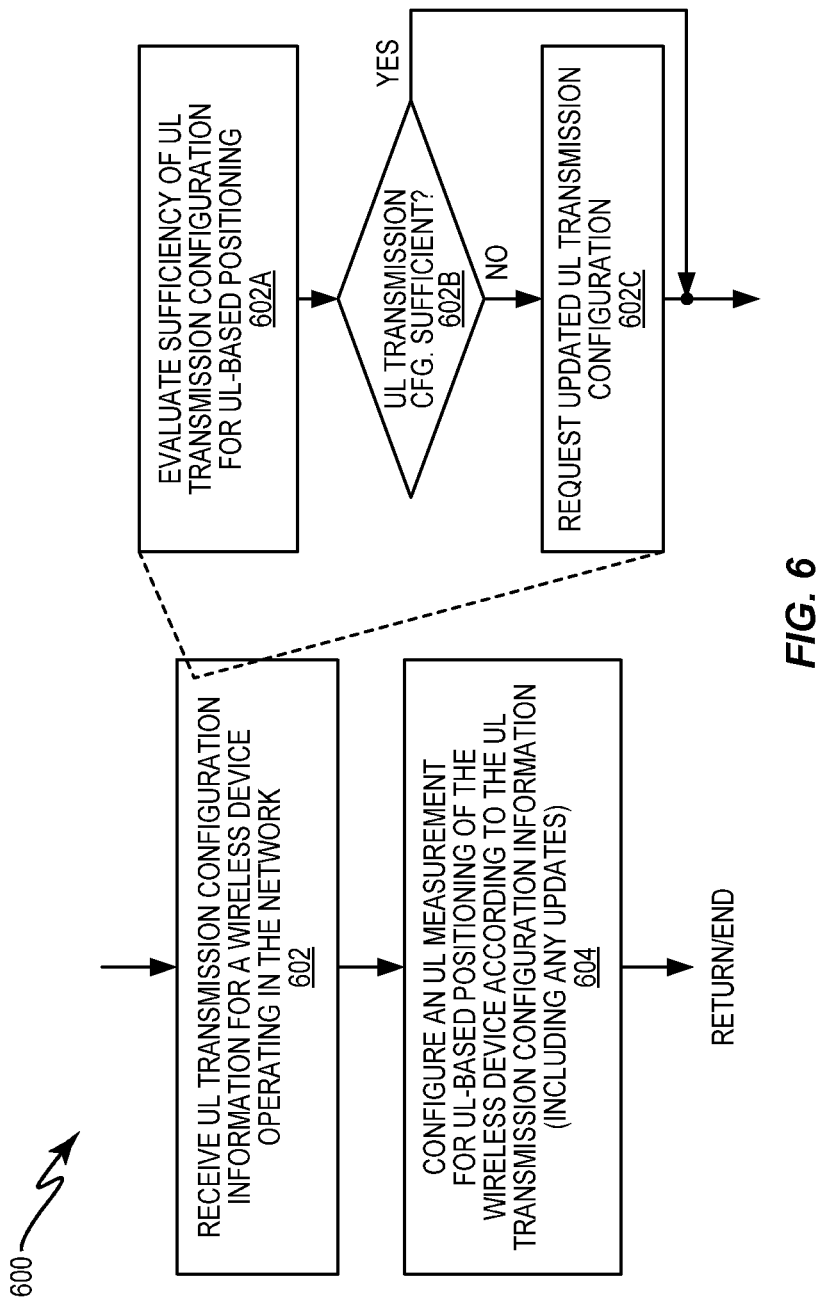
FIG. 6 is a logic flow diagram of one embodiment of a method of processing at a positioning node, for configuring and/or performing UL-based positioning of a wireless device, based on UL transmission configuration information received for the device.

FIG. 6 illustrates an example method of processing node operations corresponding to the above example configuration details for the positioning node 40. The method 400 is performed at the positioning node 40 for performing UL-based positioning of wireless devices 12 operating within the network 10. The method 400 includes receiving (Block 602) UL transmission configuration for a wireless device 12 operating within the network 10, including receiving at least one of resource allocation information for one or more UL transmissions for the wireless device, and UL signal characteristics information for the wireless device 12. The method continues with configuring (Block 604) an UL measurement by the positioning node 40 or by an associated LMU 18, according to the resource allocation information and/or the UL signal characteristics information, for UL-based positioning of the wireless device 12.

Also as noted, the positioning node 40 may evaluate the sufficiency of the UL transmission configuration of given wireless devices 12, for UL-based positioning. Blocks 602A, 602B and 602C provide example processing details for such an evaluation, as may be done "inside" of the processing identified as Block 602 in the diagram.

According to these further details, the positioning node 40 evaluates the sufficiency of the UL transmission configuration of a given wireless device 12, for UL-based positioning of the wireless device 12 (Block 602A). If the UL transmission configuration is deemed sufficient (YES from Block 602B), processing continues with Block 604 in the diagram. However, if the UL transmission configuration is deemed insufficient (NO from Block 602B), processing continues with requesting an updated UL transmission configuration (Block 602C). The request may be initiated with a serving eNB 16 of the wireless device 12, for example. In any case, it will be understood that the processing of Block 604 is performed with respect to the UL transmission configuration information, including any updates made to the configuration as a consequence of the request in Block 602C.

With the above positioning node method in mind, and with the other foregoing examples in mind, it will be appreciated that one advantage of the teachings herein is the exploitation of UL transmission configuration information available in the wireless devices 12 themselves, and the obtaining and using of such information to configure UL-based positioning measurements with respect to such devices. The corresponding methods and apparatuses taught herein reduce the internode signaling that would otherwise be needed to obtain such information elsewhere, and address the fact that such information as known elsewhere in the network 10 may be incomplete or outdated. The teachings herein also obviate the need to mandate the use of LPPa, for example, for transferring such information within the network 10, meaning that LPPa can remain an optional protocol, in at least some implementations. Thus, the teachings herein provide substantive but efficiently-gained enhancements to UL-based positioning, based on defining the type(s) of UL transmission configuration information that are relevant to more accurately or appropriately configuring one or more UL signal measurements, for UL-based positioning, and by obtaining such information from the wireless devices 12 themselves.

Thus, among the various aspects of this disclosure, a method is taught for obtaining information from a wireless device 12 to facilitate UL positioning of the wireless device 12, with a reduced dependency on supporting radio network nodes, and thereby enabling the option of user-plane based UL positioning, for example. Further, a method is taught for obtaining inter-RAT UL transmission configuration information via a wireless device 12, which information is be used to facilitate UL-based positioning in one or more embodiments. Still further, a method is taught for reusing UL transmission configuration information from one or multiple wireless devices 12 to facilitate UL-based positioning of one or more other wireless devices 12.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed.

What is claimed is:

1. A wireless device configured for operation in a wireless communication network and comprising:
   a communication interface configured for communicating with the wireless communication network; and
   one or more processing circuits configured to communicate with a positioning node in the wireless communication network via the communication interface and to support uplink-based (UL-based) positioning of the wireless device by the wireless communication network, based on being configured to:
      receive a request from the positioning node for UL transmission configuration information or detect a positioning event trigger for UL-based positioning; and
      respond to the request or trigger by sending UL transmission configuration information to the positioning node, including at least one of: resource allocation information for one or more UL transmissions for the wireless device, and UL signal characteristics information; and
   wherein the one or more processing circuits are further configured to, in advance of sending the UL transmission configuration information to the positioning node, determine whether an UL transmission configuration of the wireless device is sufficient for the UL-based positioning and, in response to determining that the UL transmission configuration is not sufficient, request an updated UL transmission configuration that is sufficient for the UL-based positioning, and wherein the UL transmission configuration information sent to the positioning node corresponds to the updated UL transmission configuration.

2. The wireless device of claim 1, wherein the one or more processing circuits are configured to send at least the resource allocation information, where the resource allocation information comprises at least one of UL signal bandwidth information and UL scheduling information.

3. The wireless device of claim 1, wherein the one or more processing circuits are configured to send at least the UL signal characteristics information, where the UL signal characteristics information comprises at least one of UL transmit power, UL transmission sequence numbers, UL transmission scrambling codes, and base station and/or cell identification numbers associated with UL transmissions by the wireless device.

4. The wireless device of claim 1, wherein the one or more processing circuits are configured to send information indicating Radio Access Technology (RAT) capabilities of the wireless device, as part of the UL transmission configuration information.

5. The wireless device of claim 1, wherein the one or more processing circuits are configured to send the UL transmission configuration information as control-plane signaling or as user-plane signaling.

6. The wireless device of claim 1, wherein the one or more processing circuits are configured to send the UL transmission configuration information using the Long Term Evolution Positioning Protocol (LPP) or the LPP Extensions (LPPe), or using the Secure User Plane Location (SUPL) protocol.

7. The wireless device of claim 1, wherein the one or more processing circuits are configured to determine whether the UL transmission configuration is sufficient for UL positioning by determining whether UL signals that are necessary for the UL-based positioning are scheduled and sufficient for the UL-based positioning.

8. The wireless device of claim 1, wherein the one or more processing circuits are configured to determine whether the UL transmission configuration is sufficient for the UL-based positioning based on any one or more of: a comparison of the UL transmission configuration with a pre-defined reference configuration, an evaluation of a target measurement quality associated with the UL-based positioning, an evaluation of a target positioning Quality-of-Service (QoS) associated with the UL-based positioning, an evaluation of a speed of the wireless device, and an evaluation of UL frequencies or bandwidths associated with the UL transmission configuration.

9. A method at a wireless device for supporting uplink-based (UL-based) positioning of the wireless device by a wireless communication network, said method comprising:
  detecting a positioning event trigger for UL-based positioning, or receiving a request from a positioning node in the wireless communication network for UL transmission configuration information; and
  responding to the request or trigger by sending UL transmission configuration information to the positioning node, including at least one of: resource allocation information for one or more UL transmissions for the wireless device, and UL signal characteristics information; and wherein the method further comprises, in advance of sending the UL transmission configuration information to the positioning node, determining whether an UL transmission configuration of the wireless device is sufficient for the UL-based positioning and, in response to determining that the UL transmission configuration is not sufficient, requesting an updated UL transmission configuration that is sufficient for the UL-based positioning, and wherein the UL transmission configuration information sent to the positioning node corresponds to the updated UL transmission configuration.

10. The method of claim 9, wherein said sending comprises sending at least the resource allocation information, including sending at least one of UL signal bandwidth information and UL scheduling information.

11. The method of claim 9, wherein said sending comprises sending at least the UL signal characteristics information, including sending at least one of UL transmit power, UL transmission sequence numbers, UL transmission scrambling codes, and base station and/or cell identification numbers associated with UL transmissions by the wireless device.

12. The method of claim 9, wherein said sending includes sending information indicating Radio Access Technology (RAT) capabilities of the wireless device, as part of the UL transmission configuration information.

13. The method of claim 9, wherein said sending comprises sending the UL transmission configuration information as control-plane signaling or as user-plane signaling.

14. The method of claim 9, wherein said sending comprises sending the UL transmission configuration information using the Long Term Evolution Positioning Protocol (LPP) or the LPP Extensions (LPPe), or using the Secure User Plane Location (SUPL) protocol.

15. The method of claim 9, wherein said determining whether the UL transmission configuration is sufficient for UL positioning comprises determining whether UL signals that are necessary for the UL-based positioning are scheduled and sufficient for the UL-based positioning.

16. The method of claim 9, wherein said determining whether the UL transmission configuration is sufficient for the UL-based positioning comprises any one or more of: a comparison of the UL transmission configuration with a pre-defined reference configuration, an evaluation of a target measurement quality associated with the UL-based positioning, an evaluation of a target positioning Quality-of-Service (QoS) associated with the UL-based positioning, an evaluation of a speed of the wireless device, and an evaluation of UL frequencies or bandwidths associated with the UL transmission configuration.

* * * * *